2,986,933
HELICOPTER AIR SPEED MEASURING INSTRUMENT

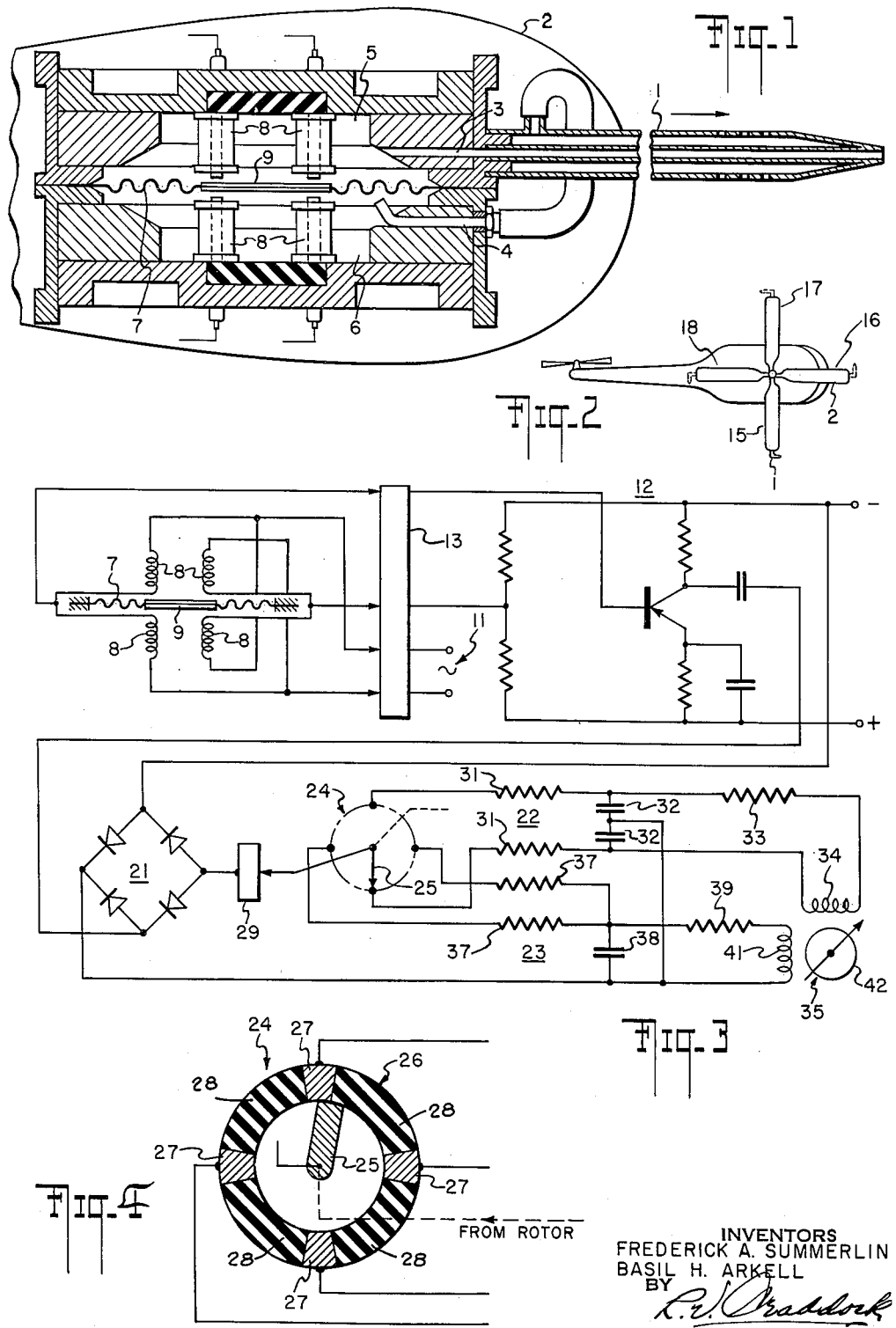
June 6, 1961 — F. A. SUMMERLIN ET AL — 2,986,933
HELICOPTER AIR SPEED MEASURING INSTRUMENT
Filed Oct. 21, 1958
INVENTORS
FREDERICK A. SUMMERLIN
BASIL H. ARKELL
BY
ATTORNEY 2,986,933
Patented June 6, 1961

Frederick Arthur Summerlin, Isleworth, and Basil Henry Arkell, Keston, England, assignors to The Sperry Gyroscope Company Limited, Brentford, England, a British company
Filed Oct 21, 1958, Ser. No. 768,815
Claims priority, application Great Britain Oct. 23, 1957
5 Claims. (Cl. 73—181)

This invention relates to airspeed-sensitive instruments for example for measuring the airspeed of helicopters, and one object is to provide an instrument which is capable of measuring airspeed in a certain direction, and perhaps also in a direction at right angles to it. In a helicopter, for example, a conventional Pitot instrument is not practicable for measuring forward speeds since the range of speeds to be measured extends from about 1 knot to about 100 knots, and since the indication of a Pitot instrument is proportional to the square of the forward speed, this would involve the accurate measurement of pressures over a range of 1 to $100^2$. A conventional pendulum instrument does not always give a correct measure of sideways speed with a helicopter because of the side forced produced by the tail rotor.

According to the present invention, and airspeed-sensitive instrument comprises a Pitot pressure-measuring device mounted at a certain radius from an axis to rotate about the axis so that in different positions of rotation it will face in different directions to measure the pressure as it rotates, and means arranged to combine signals representing the measurements made at selected positions in each revolution of the device.

The axis could be a horizontal axis transverse to the fore-and-aft axis of a helicopter if sideways speed were not to be measured, but preferably the axis is a vertical axis, and then it is convenient for the pressure-measuring device to be mounted on a rotor blade of the helicopter.

Conveniently the pressure-measuring device is directed at right angles to the axis of the rotor blade at such a radius that the normal rotational speed of the device is a little greater than the maximum airspeed of the helicopter.

By combining the measurements made at selected positions in each revolution of the device in an appropriate manner, a measure of the forward speed and of the sideways speed can be obtained.

Thus the combining means may include means arranged to subtract, one from the other, the signal representing the measurement made at a position in which the pressure-measuring device is directed towards a certain direction, for example, the fore-and-aft axis of a helicopter, and at a position spaced 180° from this position to provide a difference signal proportional to the speed in the certain direction.

To remove the unknown constants in the speed signal the combining means may also include means arranged to add the signals representing the measurements made at the two positions intermediate between the two said positions to provide a sum signal, and means arranged to divide the difference signal by the sum signal to obtain a measure of the forward speed.

The combining means may also include means arranged to substract, one from the other, the signals representing the measurements made at the positions in which the pressure-measuring device is directed transversely to the certain direction to provide a difference signal, and means arranged to add these latter two signals to obtain a sum signal, and means arranged to divide the difference signal by the sum signal to obtain a measure of the sideways speed.

The invention may be carried into practice in different ways and one embodiment will now be described by way of example as applied to an airspeed measuring instrument for a helicopter with reference to the accompanying drawings of which:

FIGURE 1 is a section through a Pitot tube device mounted in one blade of the helicopter rotor, FIGURE 2 is a sketch plan of the helicopter used in explaining the theory of the invention, FIGURE 3 is a diagram of the circuit used in the instrument, and FIGURE 4 is a diagrammatic representation of a rotary switch used in the circuit of FIGURE 3.

A Pitot tube 1 is mounted on one rotor blade 2 of the helicopter to be directed at right angles to the axis of the blade at a radius such that its linear speed at the normal speed of rotation of the rotor is a little greater than the maximum forward airspeed of the helicopter.

The Pitot device is arranged to provide an electrical signal which is a measure of the difference between the Pitot pressure and the static pressure as measured by the Pitot tube 1. The Pitot pressure and the static pressure are supplied through passages 3 and 4 respectively to sealed chambers 5 and 6 on either side of a flexible diaphragm 7. Two similar electrical coils 8 on magnetic cores are symmetrically positioned in each of the chambers, the pole faces of cores in one chamber being opposed to those of cores in the other chamber.

The diaphragm 7 lies in the air gap defined between the two opposed pairs of cores, and carries an armature 9 which forms part of magnetic circuits containing the cores. As the diaphragm is deflected in accordance with the difference between the pressures on its two slides, the armature 9 moves towards the windings 8 in one chamber and away from the windings in the other chamber.

The windings are connected in series in a closed ring as shown in FIGURE 3 with a source 11 of A.C. voltage at a frequency of 400 cycles per second conected as shown. The common ends of the opposed pairs of windings form the output terminals, and these are connected to a transistor amplifier circuit 12.

The circuit 12 and the A.C. source 11 are mounted within the non-rotating part of the helicopter and accordingly a slip ring assembly 13 shown diagrammatically in FIGURE 3, is included between the connections from these two units to the Pitot device which is mounted in the rotating blade.

The measure of airspeed is obtained by combining the Pitot pressures measured at four different positions in the rotor cycle. These positions are shown in FIGURE 2. In the first position the rotor blade which carries the Pitot device 1 extends at right angles to the fore-and-aft axis of the helicopter with the Pitot device facing forwards as shown at 15. In the second position shown at 16 the blade 2 is directed forwards and the Pitot tube is directed to port. The third and fourth positions 17 and 18 are successively advanced by 180° from the first two positions 15 and 16.

It will be appreciated that if V is the linear velocity of rotation of the Pitot tube 1, $v$ is the forward airspeed of the helicopter and $v_s$ is the sideways airspeed of the helicopter, the measurements made in the four positions will be proportional to the squares of the following quantities:

$$V+v$$
$$V-v_s$$
$$V-v$$
$$V+v_s$$

In each case the constants of proportionality K will be the same.

If now the signals representing the first and third measurements are subtracted one from the other, the difference will be equal to $4KVv$, and if the signals representing the second and fourth measurements are added, the sum will be equal to $2K(V^2+v_s^2)$ which will be nearly $2KV^2$ if $v_s$ is small compared with V as will almost always be the case. Thus the quotient of the difference of the first and third signal $4KVv$ and the sum of the second and fourth signals $2KV^2$ is equal to $2v/V$, and since for most helicopters V can be considered to be a constant, this quotient is proportional to the forward airspeed $v$, the proportionality constant being $$\frac{2}{V}$$

which can easily be determined.

This desired combination of the measurements made at the four positions of the Pitot tube is carried out in the circuit shown in FIGURE 3. The output from the amplifier 12 is rectified in a bridge rectifier 21 and fed to a subtracting circuit 22 and an adding circuit 23 by way of a rotary switch device 24 shown diagrammatically in FIGURE 3 and in more detail in FIGURE 4.

The switch device comprises a rotor 25 driven with the helicopter rotor, and a stator 26 having four contacts 27 spaced apart by insulating blocks 28. The rotor 25 is arranged to be connected to a different one of the contacts 27 when the helicopter rotor is in each of the four positions described with reference to FIGURE 2. The contacts in fact are large enough for contact to be made with the rotor when the helicopter blade carrying the Pitot device 1 is within an angle of 10° of the nominal position described above. This means that contact between the rotor and each of the contacts 27 will be maintained for about 20° movement of the rotor. Since the rotor 25 is driven with the helicopter rotor, it is necessary to include a slip ring 29 between one output terminal of the rectifier 21 and the rotor 25 of the switch 24.

The contacts 27 which are connected to the rotor 25 when the helicopter rotor is in the first and third positions are connected each through a resistor 31 to the outer ends of a series connection of two condensers 32. The outer ends are connected through a resistor 33 to one winding 34 of a ratiometer instrument 35 and the common point of the two condensers 32 is connected to the other output terminal of the rectifier 21.

The effect is that one of the condensers 32 will be charged to a potential proportional to the output of the Pitot device obtaining in the first position of the rotor, and the other condenser will be charged to a potential proportional to the output obtaining during the third position, while the net potential difference across the winding 34 will be equal to the difference between these two condenser potentials. In other words the winding 34 will be excited by a potential proportional to $4KVv$.

The contacts 27 which are connected to the rotor 25 during the second and fourth positions of the helicopter rotor are connected through resistors 37 to one end of a condenser 38, the other end of which is connected to the second output terminal of the bridge rectifier 21. Accordingly this condenser 38 will be charged in accordance with the sum of the two outputs from the Pitot device in the second and fourth positions of the rotor, and this potential is connected through a resistor 39 to the second winding 41 of the ratiometer 35. This winding will be excited by a potential proportional to $2KV^2$.

The ratiometer 35 has a rotor 42 whose position is dependent upon the ratio of the excitations of the windings 34 and 41, which ratio will be proportional to $2v/V$.

As described above, if the rotor speed V is constant, the deflection of the ratiometer will be proportional to the forward airspeed $v$.

The method described for measuring the forward airspeed has the advantage that the pressure change to be measured is proportional to the forward speed and not to the square of the forward speed, as is the case with conventional Pitot tube airspeed measuring devices and is thus more suitable to the measurement of the forward speed of a helicopter.

Only one pick-off is used, so that matching of pick-offs is unnecessary, and the pick-off sensitivity is relatively unimportant. The system is not very sensitive to zero drift of the pick-off, for example 10 percent of full-scale drift of the zero produces an error in the airspeed reading of about 10 percent of the correct airspeed. It should also be noticed that the instrument shows both positive and negative airspeeds, and this is important since often a helicopter will fly backwards.

A similar ratiometer may be arranged to present the quotients of the difference between the signals representing the second and fourth measurements and the sum of these signals, and this quantity will be equal to $2Vv_s/(V^2+v_s^2)$. If the rotor speed V is large compared with the sideways airspeed $v_s$, this quantity reduces to $2v_s/V$ which is a measure of the sideways airspeed.

The pilot can control his machine to bring this indication to zero.

What is claimed is:

1. An air speed-sensitive instrument comprising a Pitot pressure-measuring device mounted at a certain radius from an axis to rotate about the axis so that in different positions of rotation it will face in different directions to measure the pressure as it rotates, signal generating means responsive to the pressure measurements for providing signals representative thereof, means arranged to combine said signals representing the pressure measurements made at selected positions in each revolution of the device to provide a measure of the airspeed, said combining means including means arranged to subtract, one from the other, the signal representing the pressure measurement made at a position in which the pressure-measuring device is entirely in a certain direction and at a position spaced 180° from this position to provide a difference signal proportional to the airspeed in the certain direction, said combining means further including means arranged to add the signals representing the pressure measurements made at the two positions intermediate between the two said positions to provide a sum signal, and means arranged to divide the difference signal by the sum signal to obtain a measure of the airspeed in the certain direction.

2. An air speed-sensitive instrument comprising a Pitot pressure-measuring device mounted at a certain radius from an axis to rotate about the axis so that in different positions of rotation it will face in different directions to measure the pressure as it rotates, signal generating means responsive to the pressure measurements for providing signals representative thereof, means arranged to combine said signals representing the pressure measurements made at selected positions in each revolution of the device to provide a measure of the air speed, said combining means including means arranged to subtract, one from the other, the signal representing the pressure measurement made at the positions in which the pressure-measuring device is directed transversely to a certain direction to provide a difference signal, means arranged to add the signals representing the pressure made at the positions in which the pressure-measuring device is directed transversely to the certain direction to obtain a sum signal, and means arranged to divide the difference signal by the sum signal to obtain a measure of the speed in the transverse direction.

3. An instrument as claimed in claim 2 in which the dividing means comprises an indicating ratiometer.

4. An instrument as claimed in claim 2, mounted on a helicopter, with the certain direction being the direction of the fore-and-aft axis of the helicopter.

5. An air speed-sensitive instrument comprising a Pitot pressure-measuring device mounted at a certain radius from an axis to rotate about the axis so that in different positions of rotation it will face in different directions to measure the pressure as it rotates, signal generating means responsive to the pressure measurements for providing signals representative thereof, means arranged to combine said signals representing the pressure measurements made at selected positions in each revolution of the device to provide a measure of the air speed, said combining means including means arranged to subtract, one from the other, the signal representing the pressure measurement made at a position in which the pressure-measuring device is directed in a certain direction and at a position spaced 180° from this position to provide a difference signal proportional to the air speed in the certain direction, said combining means further including means arranged to add the signals representing the pressure measurements made at the two positions intermediate between the two said positions to provide a sum signal, and means arranged to divide the difference signal by the sum signal to obtain a measure of the air speed in the certain direction, and also includes means arranged to subtract, one from the other, the signals representing the pressure measurements made at the positions at which the pressure-measuring device is directed transversely to the certain direction to provide a difference signal, and means arranged to add the signals representing the pressure made at the positions in which the pressure-measuring device is directed transversely to the certain direction to obtain a sum signal, and means arranged to divide the difference signal by the sum signal to obtain a measure of the speed in the transverse direction.

References Cited in the file of this patent

UNITED STATES PATENTS

| | | |
|---|---|---|
| 2,524,747 | Ayres et al. | Oct. 10, 1950 |
| 2,531,521 | Link | Nov. 28, 1950 |
| 2,624,531 | Stalker | Jan. 6, 1953 |
| 2,779,193 | Lee | Jan. 29, 1957 |
| 2,844,960 | Staros | July 29, 1958 |
| 2,846,878 | Carbonara | Aug. 12, 1958 |